United States Patent [19]
Pincelli et al.

[11] 3,984,512
[45] Oct. 5, 1976

[54] PROCESS FOR THREADING COLLAGEN CASING THROUGH A DRYER

[75] Inventors: Richard D. Pincelli; Mark Dettman, both of Danville, Ill.

[73] Assignee: Tee-Pak, Inc., Chicago, Ill.

[22] Filed: Jan. 6, 1975

[21] Appl. No.: 538,842

[52] U.S. Cl. .................................. 264/94; 34/12; 34/21; 264/209; 264/343; 426/138; 426/140
[51] Int. Cl.² ..................... B29D 7/20; A22C 13/00
[58] Field of Search ................ 264/95, 94, 209, 89, 264/343; 426/138, 140; 428/398; 34/12, 21

[56] References Cited
UNITED STATES PATENTS

| | | | |
|---|---|---|---|
| 1,536,700 | 5/1925 | Brucker | 264/96 |
| 2,399,259 | 4/1946 | Taylor | 28/76 |
| 2,688,766 | 9/1954 | Huckfeldt | 264/95 |
| 2,780,512 | 2/1957 | Inoshita | 264/209 |
| 2,925,621 | 2/1960 | Parth | 264/95 |
| 2,979,777 | 4/1961 | Goldman | 264/95 |
| 3,512,997 | 5/1970 | Cohly et al. | 264/202 |

OTHER PUBLICATIONS
Kirk–Othmer Encyclopedia of Chemical Technology, vol. 15, p. 289, 2-1969.

Handbook of Chemistry and Physics, Weast, 1974-1975, vol. 55, c-367(p).

*Primary Examiner*—Jeffery R. Thurlow
*Attorney, Agent, or Firm*—Paul Shapiro; Joseph E. Kerwin; William A. Dittmann

[57] ABSTRACT

This invention relates to an improvement in a process for threading an edible collagen casing through an elongated dryer wherein the casing is inflated with a gas, sealed at an end for maintaining said gas in said casing, and then passed through the dryer. The improvement in the process resides in injecting a gas-forming material selected from the group consisting of a water-immiscible liquid having a boiling point of from about 10° – 70°C. at atmospheric pressure, a solid sublimable at a temperature below about 70°C. at atmospheric pressure, and a solid or liquid which is decomposible at a temperature below about 70°C. at atmospheric pressure into the bore of the casing prior to introducing the casing into the dryer. The elevated temperature maintained in the dryer causes the gas-forming material to vaporize, sublime, react, or decompose to a gas and thereby inflate the casing. The material is added in a proportion sufficient to inflate the casing to a predetermined pressure.

10 Claims, No Drawings

PROCESS FOR THREADING COLLAGEN CASING THROUGH A DRYER

BACKGROUND OF THE INVENTION

In recent years collagen has been widely accepted as a commercial material for the manufacture of artificial sausage casings particularly suited for the processing of pork sausages. In the manufacture of collagen casings, a collagen source, typically hide collagen, is converted into a finely divided fibrillar form and extruded in the form of a dilute collagen slurry through a die to form a tubular casing. The extruded collagen is passed into a coagulating bath which dehydrates the collagen slurry into a solid coherent collagen casing. The coagulating bath typically contains a salt such as sodium sulfate or ammonium sulfate and a small amount of alkali, e.g., sodium hydroxide or ammonia, for neutralizing excess acid which may be present in the collagen casing. The collagen casing, then, is hardened or tanned to permit further processing of the casing and to provide it with sufficient strength for its intended use. Often, a two-step tanning process is employed with the first tanning step being effected by an aluminum tanning agent, e.g., an aluminum citrate complex, and the second tanning being effected by reaction with a dialdehyde, e.g., glutaraldehyde. After tanning, the casing is inflated with air and dried in an elongated dryer with air maintained at a temperature of about 175° C. and circulated at a rate of about 2,000 feet per minute. The temperature of the casing during the drying operation is held below about 90° C. and usually below about 80° C.

One of the difficulties in drying collagen casing, as opposed to an artificial sausage casing made of regenerated cellulose, is that collagen is much more sensitive to heat than is regenerated cellulose. Collagen shrinks on heating and if the temperature of the collagen become too high it will form gelatin. The conversion of collagen to gelatin in the dryer, of course, has disastrous effects on the resulting casing. One particular disadvantage is that the casing is sticky in its gelatinized form and may adhere to the surfaces of the guide roller and cause the line to break in the dryer.

A second difficulty peculiar to collagen and not to cellulose is that if the casing is not maintained in an inflated condition in the dryer it seals against itself and is practically impossible to separate for subsequent inflation. On the other hand, cellulose can be easily threaded through the dryer in a flat state and subsequently inflated.

DESCRIPTION OF THE PRIOR ART

It has been accepted proocedure to thread a collagen casing through an elongated dryer by first gathering enough casing at the entrance to the dryer to fully extend through the dryer and then inflate the casing with air, or other gas, seal the end of the casing for maintaining the gas in the casing, and then pass the casing through the dryer. This procedure is repeated for as many lines as are required to be threaded through the dryer. One of the disadvantages with this technique is that the operataor must wait for lengths of at least 100 – 300 feet of casing (100 – 300 feet is a common length of dryers for the manufacture of collagen casing) to accumulate before he (she) can inflate the casing with air. Accordingly, this procedure takes a substantial amount of time and labor to get several casing lines threaded through the dryer.

SUMMARY OF THE INVENTION

This invention relates to an improvement in a process for threading a collagen casing through a dryer wherein a portion of the casing is inflated with a gas to a predetermined pressure, sealed to prevent the escape of gas, and passed through an elongated dryer for heating said casing to an elevated temperature. The improvement for threading the casing through the dryer comprises injecting a gas-forming material selected from the group consisting of a water-immiscible liquid having a boiling point of from about 10°– 70° C. at atmospheric pressure, a solid sublimable at a temperature below about 70° C. at atmospheric pressure, and a solid or liquid which is decomposible at a temperature below about 70° C. at atmospheric pressure into the bore of the casing in such proportion for inflating the casing to a predetermined pressure at said elevated temperature. The advantages of this process include: the ability to thread casings made of collagen through the dryer without accumulating a length of casing at least equal to the length of the dryer prior to introduction of the casing to the dryer, the ability to prevent or reduce tangling of the casing during threading, and the ability to thread a collagen casing through the dryer in a shorter time period than could heretofore be accomplished.

DESCRIPTION OF THE PREFERRED EMBODIMENTS

Gas-forming liquids suited for injection into the bore of the casing prior to introducing the casing into the dryer are those having a boiling point of from about 10°–70° C. at atmospheric pressure. When the boiling point of the liquid is less than about 10° C., considerable difficulty is experienced by the operator in injecting the liquid into the casing without incurring substantially complete vaporization of the liquid prior to introducing the casing into the dryer. Often, when the liquid has a boiling point below about 10° C. vaporization is too fast and because of the limited volume of casing at the entrance of the dryer, the pressure builds and the casing may rupture. Liquids having a boiling point in excess of about 70° C. are not desired because they generally do not completely vaporize in the dryer. It is also possible that the casing may seal against itself before the liquid has a chance to vaporize and thus result in defective casing or a break in the casing. In a preferred embodiment of the invention, the liquid injected into the casing should have a boiling point, at atmospheric pressure, of from about 20°– 50° C. Such liquids are usually completely vaporized in the initial stage (first 10 –40 feet of the dryer) and yet because of the delay in vaporization a sufficient length of casing will have been introduced into the dryer so that the pressure inside the casing does not exceed the rupture pressure of the casing.

The gas-forming liquid for injection into the collagen casing should be water-immiscible, i.e., 2 g or less of the liquid being soluble or miscible in 100 cc water at 20° C. Preferably less than 1 g is miscible per 100 cc water. As is known, there is a substantial quantity of water in the collagen casing as it is introduced to the dryer and if the liquid is highly water-soluble it can diffuse into the casing and not effect inflation of the casing.

In view of the fact that the casing is an edible casing, it is preferred that the liquid be non-toxic even though this factor has no bearing on its functionality for inflating the casing. Even though that section of casing which is first passed through the dryer normally is discarded, there may be residual liquid in the casing or vapor in the air stream which may contaminate additional casing. There are a number of non-toxic liquids meeting the criteria set forth above and, therefore, there is no advantageous reason for using a material which is toxic. In a preferred embodiment, the liquid which is injected into the casing should be non-flammable. Although the dryer temperatures are fairly low, e.g., 190° C., there always is some danger of fire when the flammable liquid is used. Flammability of the liquid is not a primary factor to be considered in view of the small proportion of liquid which is injected into the casing. But, because there are so many non-flammable, non-toxic liquids which are acceptable for achieving the desired result, i.e., the inflation of the casing at drying temperatures and the convenience in threading the collagen casing through an elongated dryer, no good reason can be seen for using a flammable liquid.

Examples of liquids suited for practicing the invention are hydrocarbons and halogenated hydrocarbons. Although the hydrocarbons are flammable, and many are toxic, they can be used for practicing this invention if appropriate care is maintained. However, the halogenated hydrocarbons are preferred because many of them are non-flammable and non-toxic. Examples of liquids which can be used for practicing this invention include: allyl chloride, amyl fluoride, 2-chloro 1,3 butadiene, ethyl ketol, trimethyl ethylene, butyl chloride, hexane, dimethyl acetylene, methylene chloride, methyl cyclobutane, 1,3 cyclopentadiene, ethylidene dichloride, allyl methyl ether, dibromoethylene, acetylene dichloride, ethyl bromide, dichloroethylene, methyl iodide, propylacetylene, dimethyl phosphine, and propenyl chloride.

Preferred halogenated hydrocarbons suited for practicing this invention include: chloroform, trichlorofluoromethane, and trichloro-trifluoroethane.

Gas-forming solids, i.e., solids which sublime at a temperature of below about 70° C. at atmospheric pressure can also be used for inflating the casing. Solid phase carbon dioxide (dry ice) is an example of a sublimable solid which will effect inflation of the collagen casing in the dryer. As those skilled in the art might expect, some difficulty is experienced with solid carbon dioxide as an inflation agent because a water layer tends to form and freeze around the dry ice particles and inhibit heat transfer to effect sublimation.

Solids or liquids which are decomposible to a gas at a temperature below about 70° C. at atmospheric pressure and preferably at a temperature of from 10°– 70° C. can also be used for practicing the invention. Like the liquids or sublimable solids used for inflating the casing, it is preferred that the gas produced is non-toxic and non-flammable but they can be used where such conditions can be tolerated. The use of these materials in the manufacture of edible casing makes processing conditions more difficult. Examples of solids and liquids decomposible to gas at appropriate temperatures include: ammonium carbonate, ammonium sulfide, ammonium sulfite, hydrogen peroxide, ammonium bicarbonate, and diazomethane.

The gas-forming materials are added to the casing in a proportion sufficient to provide a pre-determined pressure in the casing, typically from 0.5 – 5.0 psig. The proportion of gas-forming can be approximated by using the ideal gas law $PV = NRT$. The volume of the casing to be inflated can, of course, be easily obtained by knowing the length of the dryer and the diameter of the casing in the dryer at a given time. The quantity of gas-forming material, e.g., liquid, then can be calculated from the ideal gas law because the temperature of the casing in the dryer, the pressure desired in the casing, and the volume of the casing to the inflated are known. Given these variables, the ideal gas equation can be solved for the number of moles of a specific gas-forming material to be added to the casing prior to drying.

Those skilled in the art will readily recognize that none of the liquids, decomposible liquids and solids or sublimable solids, as gas-fomring materials behave as an ideal gas and that the ideal gas law is a very rough approximation of the amount of gas-forming material to be used for inflating the casing. However, accurate size control is not of primary importance in the threading of the casing through the dryer. Size control can be regulated after the casing has been threaded through the dryer. The injection of the gas-forming material into the casing is of paramount importance for maintaining the casing in an inflated condition while it is being threaded through the dryer.

The following examples are provided to illustrate preferred embodiments of the invention and are not intended to restrict the scope thereof. All percentages are expressed as weight precentages.

EXAMPLE 1

A collagen casing is prepared in accordance with accepted commercial procedures from fresh heifer hides. In this procedure, the hide is limed for a period of about 3 hours at 10° C. in order to loosen and partially remove the hair. The hide then is washed to remove the liming solution and is defleshed and split to remove the remaining hair and epidermal layer. Next, the hide splits are cut into small square or rectangular pieces, e.g., ¼ to about 4 inches on the side in preparation for grinding.

The small pieces of threaded hide are converted to a fine pulp by successively passing the hide through a meat grinder. Ice is mixed with the hide splits to maintain the temperature below about 20° C. and preferably below about 10° C. Usually, three passes are sufficient through the meat grinder with the smallest grind being about 3/64 of an inch. At this point, water is added to the pulp to produce a mixture consisting of about 90% water and 10% collagen.

The collagen is treated with dilute lactic acid to produce a pH of about 2.5 – 3.7 for a time sufficient to effect substantially complete swelling of the collagen. The swollen collagen is mixed with additional water to produce a slurry consisting approximately of 4% collagen and 1.2% lactic acid. The paste is homogenized, filtered to remove any solid contaminates, and deaerated.

The acid-swollen slurry is pumped under pressure through an extrusion die having counter-rotating and inner parts similar to the one described in Becker, U.S. Pat. No. 2,046,541 as a thin walled tube into a concentrated solution of ammonium sulfate where the fibrils are dehydrated and collapsed to form a film sufficiently coherent for further processing. Typically, the coagulation bath is circulated both inside and outside the tube to maintain the tube in an inflated condition and to insure proper coagulation of the casing both on the inside and outside.

After the film is coagulated in the ammonium sulfate solution the casing is tanned with a conventional tanning agent, e.g., a partially olated aluminum citrate complex and subsequently tanned with glutaraldehyde. The casing then is plasticized in a 3% glycerin bath and washed. The casing at this stage is ready for drying in an elongated dryer.

In threading the casing through the dryer, the casing is passed between a pair of bull wheels at the entrance to the dryer. The bull wheels seal the casing at the entrance of the dryer to confine the gas in the casing to the dryer section and prevent it from continuing back through the process which includes plasticizing and tanning of the casing. After the casing is passed through the bull wheels, 0.46 moles of trichloro-trifluoroethane (trichloro-trifluoroethane has a boiling point of about 35° C. and a water miscibility of about 1 g per 100 cc at 20° C.) is introduced into the bore of the casing and the casing end sealed. The addition of 0.46 moles of trichlorotrifluoroethane to the casing is based on a calculation using the ideal gas law $PV = NRT$. For this calculation, a dryer length of 150 feet is employed, although dryers typically range from 100 – 300 feet in length. The diameter of the casing is estimated to be 0.66 inches. The volume of the casing of this length and diameter is calculated to be 9.7 liters. It is assumed that the temperature of the casing or liquid in the dryer reaches 70° C. or 323° K. A pressure of about 1.2 atmospheres is desired in the casing.

It is understood that trichloro-trifluoroethane under these conditions does not perform as an ideal gas nor does the ideal gas law take into account the diffusion of the trichloro-trifluoroethane through the casing due to the microporosity thereof. But, it gives an approximation of the quantity of trichloro-trifluoroethane to add to the casing for inflating the casing sufficiently to prevent it from fusing in the dryer.

The operators note that this procedure is extremely convenient for threading the casing through the dryer and is much more efficient than the procedure of coiling at least 160 feet of casing at the entrance to the dryer, inflating this casing with air, and then passing the casing through the dryer.

EXAMPLE 2

The procedure of Example 1 is followed except that 0.5 moles ethylbromide is added to the casing as a replacement for the trichloro-trifluoroethane. Ethylbromide has a boiling point of about 38° C and is extremely effective for inflating the casing and easy threading of the casing through the dryer.

EXAMPLE 3

The procedure of Example 1 is followed in the production of collagen casing except that chloroform, which has a boiling point of about 61° C., is substituted for the trichloro-trifluoroethane used for the initial inflation of the casing. Although chloroform is an acceptable liquid for inflating the casing and threading it through the dryer, it does not seem to be as desirable as the trichloro-trifluoroethane.

EXAMPLE 4

The procedure of Example 1 is followed in the production of collagen casing except that ammonium carbonate is substituted for the liquid trichloro-trifluoroethane. Because 1 mole ammonium carbonate decomposes to 2 moles ammonia and 1 mole carbon dioxide, only ⅓ of the number of moles of trichloro-trifluoroethane (about 0.2 moles $(NH_4)_2CO_3$) are used. Ammonium carbonate works well for threading the casing through the dryer.

We claim:

1. In a process for threading a collagen casing through a dryer wherein a portion of said casing is inflated with a gas to a predetermined pressure, sealed to prevent the escapement of said gas from said casing, and passed through an elongated dryer for heating said casing to an elevated temperature, the improvement for threading said casing through said dryer which comprises: injecting, into the bore of the casing, before passing the casing through the dryer a gas forming material which will generate a gas at the elevated temperature in the dryer, the gas forming material being selected from the group consisting of a water-immiscible liquid having a boiling point of from about 10°– 70° C. at atmospheric pressure, a solid sublimable at a temperature below about 70° C at atmospheric pressure, and a solid or liquid which is decomposible at a temperature below about 70° C at atmospheric pressure, the gas-forming material being injected into the bore of the casing in such proportion to inflate the casing to said predetermined pressure when the gas is generated from the injection material at said elevated temperature whereby the casing is threaded through the dryer without first accumulating a length of casing at least equal to the length of the dryer.

2. The process of claim 1 wherein said gas-forming material is a non-decomposible liquid having a boiling point of from about 10° – 70° C.

3. The process of claim 2 wherein said liquid is non-toxic and has a boiling point of from about 20° – 50° C.

4. The process of claim 3 wherein said liquid is non-flammable.

5. The process of claim 4 wherein said liquid is a halogenated hydrocarbon.

6. The process of claim 5 wherein said halogenated hydrocarbon is added in a proportion sufficient to provide a pressure of from about 0.5 – 5 pounds per square inch.

7. The process of claim 5 wherein said halogenated hydrocarbon is a halogenated paraffin.

8. The process of claim 7 wherein said halogenated paraffin is selected from the group consisting of halogenated methane and halogenated ethane.

9. The process of claim 8 wherein said halogenated hydrocarbon is trichloro-trifluoroethane.

10. The process of claim 8 wherein said halogenated hydrocarbon is trichlorofluoromethane.

* * * * *